July 24, 1962 W. P. DALRYMPLE 3,045,411
LIQUID AND GAS SEPARATORS
Original Filed Aug. 7, 1953
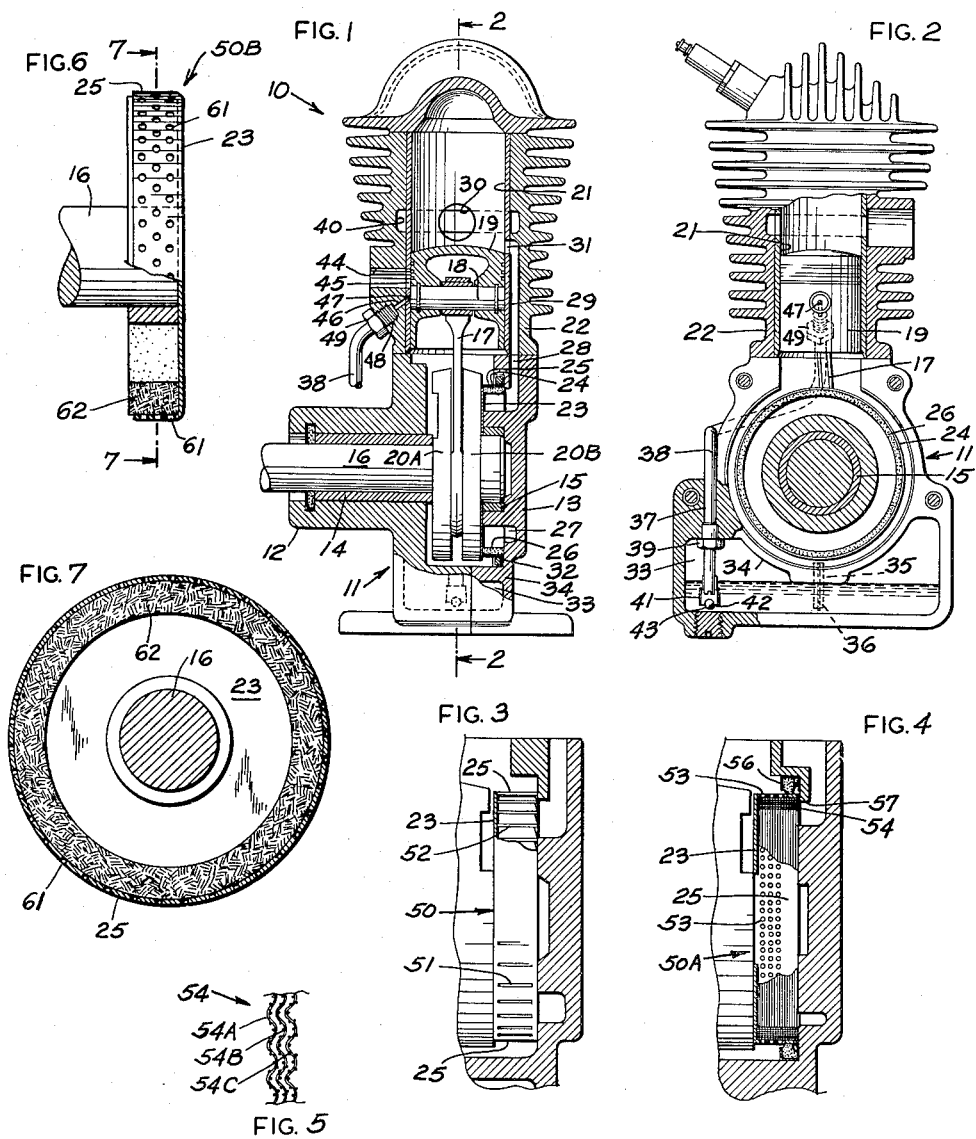
INVENTOR.
WILLIAM C. DALRYMPLE
BY
Wallace and Cannon
ATTORNEYS

United States Patent Office 3,045,411
Patented July 24, 1962

3,045,411
LIQUID AND GAS SEPARATORS
William P. Dalrymple, Royal Oak, Mich., assignor to American Brake Shoe Company, New York, N.Y., a corporation of Delaware
Original application Aug. 7, 1953, Ser. No. 372,825, now Patent No. 2,893,362, dated July 7, 1959. Divided and this application June 26, 1959, Ser. No. 823,130
3 Claims. (Cl. 55—400)

This invention relates to a rotary centrifugal separator for removing entrained liquids from a flow of a gaseous fluid. The rotary centrifugal separator of the invention may be mounted within a crankcase of an internal combustion engine utilizing crankcase compression for removing entrained oil droplets from the air compressed within the crankcase prior to the transfer of such compressed air to the firing chamber, and is described in that connection, but may also be utilized in a variety of different applications as pointed out hereinafter. This application is a division of my co-pending application Serial No. 372,825, filed August 7, 1953, and now U.S. Patent No. 2,893,362.

In many applications it is highly desirable that a gaseous fluid be maintained substantially completely free of any entrained liquid, particularly oil and water. For example, in operations using compressed air, such as pneumatically operated tools, water in the air lines may condense at low ambient temperatures and cause rusting of the tools. If the ambient temperatures are sufficiently low, the entrained water may even condense and freeze and thereby damage the tools or the air lines. Also, when a source of compressed air is used with an air brush for painting, any entrained oil droplets within the compressed air may produce a serious defect in the appearance of the painted surface. The problem of an entrained liquid in a gaseous fluid arises also in processes which utilize steam. In such cases any entrained oil particles in the steam may adversely affect the process. Another particular instance in which it is desirable that a gaseous fluid be maintained substantially free of any entrained liquid is in two-stroke cycle internal combustion engines which utilize crankcase compression to precompress the inlet air for the combustion chamber to provide improved scavenging action.

It is customary in two-stroke cycle engines to so seal or otherwise arrange the crankcases thereof that the downstroke of the pistons of the engine may be utilized to compress fluid admitted to the crankcase, such fluid being either air that is to be subsequently directed to the firing chambers of the engines or an admixture of air and fuel that is to be directed to such firing chambers. It has been observed, where fluid is so compressed in the crankcases of two-stroke cycle engines in instances where lubricant is present in the crankcases in the form of a mist, as where resort is had to a splash-type lubrication system, that the lubricant becomes entrained in the compressed fluid and is carried to the firing chambers. Because such lubricant may not be properly burned, carbon deposits are resultantly formed and, particularly where such deposits foul the spark plug, the efficiency of the engine is impaired. Moreover, in operation of engines of this kind, the carbon deposits so build up that it is necessary, at rather frequent intervals, to tear down the engine and remove the carbon deposits.

Accordingly, it is a primary object of this invention to provide a liquid and gas separator for removing entrained liquid from a flow of a gaseous fluid.

It is another object of this invention to interpose an annular foraminous barrier in a gaseous fluid flow path in a manner such that the gaseous fluid flows radially inwardly of the barrier and to rotate the barrier to develop a centrifugal force within any entrained liquid droplets passing within the barrier to eject the liquid radially outwardly of the barrier and thereby separate the entrained liquid from the gas.

It is another object of this invention to provide a rotatable liquid and gas separator which incorporates a foraminous annular barrier element which comprises a plurality of concentric rings of a fine metal mesh.

It is another object of this invention to provide a rotatable liquid and gas separator which incorporates a foraminous annular barrier element which incorporates a fibrous or felt material therein.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the accompanying drawings:

FIG. 1 is a vertical sectional view of a single cylinder two-stroke cycle internal combustion engine embodying a liquid and gas separator constructed in accordance with the invention;

FIG. 2 is a sectional view taken substantially in the direction of the arrows 2—2 in FIG. 1;

FIG. 3 is an enlarged detailed view of one embodiment of a separator according to the invention;

FIG. 4 is an enlarged view, partly in section, of another embodiment of a liquid and gas separator according to this invention;

FIG. 5 is an enlarged detailed view of a portion of the barrier element incorporated in the embodiment of the separator illustrated in FIG. 4.

FIG. 6 is an elevation view, partly in section, of a third embodiment of a liquid and gas separator constructed in accordance with this invention; and FIG. 7 is a sectional view taken substantially in the direction of the arrows 7—7 in FIG. 6.

Referring to FIGS. 1 and 2 there is illustrated a two-stroke cycle, single cylinder, internal combustion engine 10 which incorporates a liquid and gas separator constructed in accordance with this invention for separating entrained oil droplets from air compressed within the crankcase. The engine embodies a crankcase 11 which has a boss 12 at one side thereof. The crankcase also includes an end cover 13 that is bolted or otherwise secured in position of use. A conventional bronze sleeve bearing 14 is provided in the boss 12 and a similar bearing 15 is provided in a recess in the end cover 13 and, if desired, a so-called oilless bearing might be used as the bearings 14 and 15. A crank shaft 16 is journaled in these bearings and includes a crank arm to which the lower end of a connecting rod 17 is connected. The upper end of the connecting rod is connected to a wrist pin 18 in the piston 19 that is reciprocal in the sleeve 21 provided in the cylinder body 22. A pair of counterweights 20A and 20B are mounted on the crankshaft on opposite sides of the connecting rod 17.

In the crank case 11 a separator element for separating entrained lubricant from the air supplied to the combustion chamber is provided and this separator element includes a plate 23 mounted on the crankshaft 16 to rotate therewith. A flange or band 25 is provided at the periphery of the plate 23 and has a plurality of openings 24 formed therein. A ring of suitable porous or foraminous material 26 is mounted inwardly of the flange 25 and the arrangement is such that this porous material is interposed between the interior of the crankcase 11 and the port 27 provided at the lower end of a passage 28 that leads to a passage 29 and terminates in a port 31 in the sleeve 21 in position to be disclosed as the piston moves into its lowermost position in the course of reciprocation thereof in the sleeve 21. The port 27 and the passages 28 and 29 afford what is referred to as a transfer passage. In order to prevent leakage past the rotary filter comprising the plate 23, ring 24 and foraminous material 26, a sealing ring 32 is provided which bears on the outer periphery of the flange 25 and which engages adjacent portions of the end cover 13 of the crankcase 11.

A reservoir 33 is provided beneath the lower wall 34 of the crankcase 11. An opening 35, see FIG. 2, is formed in the wall 34 and a tube 36 is mounted in this opening to project for a predetermined distance above the inner face of the lower wall 34, the lower end of the tube 36 leading into the reservoir 33. Lubricant supplied to the crankcase 11 collects in the lower part thereof and when the level of the lubricant so collected is above the upper end of the tube 36 the lubricant flows through this tube into the reservoir 33.

An opening 37 is provided in the wall of the crankcase 11 and is enlarged and tapped at its lower inner end so that when a tube 38 is passed through the opening 37, to extend into the reservoir 33, a tube fitting 39 may be seated in the enlarged tapped portion of the opening 37 to clamp the tube 38 into position. A valve housing 41 is provided at the lower end of the tube 38 and provides in the lower wall thereof a valve seat 42 on which a ball valve member 43 may seat. A supply of lubricant is introduced into the reservoir 33 through a closable opening (not shown) and the position of the lower end of the valve housing 41 is such that when a proper supply of lubricant has been introduced into the reservoir 33, the lower end of the valve housing 41 will be disposed well below the top level of the lubricant supply in the reservoir 33.

A circular exhaust port 30 is formed in the sleeve 21 and communicates with a circumferential recess 40 extending around the interior of the cylinder casing 22. The recess 40 in turn communicates with an exhaust conduit, not shown.

An inlet passage 44 extends through the cylinder body 22 and terminates in the cylinder bore at an inlet port 45. A conduit or the like (not shown) leads from a suitable source of fuel, which may be a carburetor, to the passage 44 and the arrangement is such that as the piston approaches the upper end of its stroke in the sleeve 21 the port 45 will be disclosed so that desirably an admixture of air and fuel will be admitted into the sealed crankcase 11 to be compressed therein in the ensuing downstroke of the piston.

Under certain circumstances as, for example, when the engine is cold, fuel admitted through the port 45 may tend to condense and run down over the portion of the cylinder wall beneath the port 45. Should this occur the film of lubricant on the cylinder wall adjacent to the port 45 may be washed away thereby exposing the cylinder wall to the wall of the piston and this could possibly result in seizing of the piston and could be otherwise objectionable. Therefore, in order to insure that a supply of lubricant will be maintained on the cylinder wall, and especially on the portion thereof immediately beneath the port 45, we provide a passage 46 in the cylinder housing 22 which leads to a port 47 in the sleeve 21, said port 47 being located immediately beneath the port 45. The passage 46 leads from an enlarged tapped opening 48 provided in the cylinder wall 21 and a tube fitting 49 is adapted to be secured in this enlarged tapped opening to thereby secure in position the upper end of the lubricant supply tube 38.

As an incident to each upstroke of the piston 19 in the sleeve 21 a suction effect will be induced in the crankcase 11 and this is effective to unseat the ball valve 43 from the valve seat 42 and thereupon lubricant is withdrawn from the supply thereof in the reservoir 33 into the tube 38. In the course of downstroke of the piston the ball valve 43 re-seats on the valve seat 42 and thereby prevents lubricant in the tube 38 from flowing back into the reservoir 33. Thus, in the course of operation of the engine, a supply of lubricant will be built up in the tube 38. When the piston 19 is near the uppermost position thereof attained in the sleeve 21, the port 44 is disclosed and lubricant then flows onto the wall of the cylinder to thereby insure a supply of lubricant on the wall of the cylinder adjacent to the port through which fuel is admitted to the crankcase. Lubricant so supplied to the cylinder wall flows down and around the same and onto operative parts of the engine in and associated with the crankcase so as to thereby be supplied to the operative parts of the engine. If desired, a finger or scoop may be associated with the connecting rod or crank on the crankshaft to dip into the supply of lubricant collected at the bottom of the crankcase so that this lubricant is picked up and then splashed onto operative parts of the engine.

By reason of such splash lubrication, a mist of lubricant is maintained in the crankcase in the course of operation of the engine, and even though an admixture of fuel and air is admitted into the crankcase to be compressed therein in the course of the downstrokes of the piston, the lubricant is prevented from passing to the firing chamber in the cylinder above the piston by reason of the interposition of the rotary separator element between the crankcase and the firing chamber. Inasmuch as the separator element is in rotation in the course of operation of the engine, centrifugal force is effective to throw off lubricant picked up thereby and this lubricant flows back into the crankcase to be returned to the reservoir 33, as explained hereinabove. Thus the rotation of the separator renders the same self-cleaning so that the separator remains effective over protracted periods.

In FIG. 3 there is illustrated one embodiment of a liquid and gas separator constructed in accordance with this invention. A disc or plate 23 is provided with a flange or ring 25 at the periphery thereof. The plate and flange constitute a housing or carrier 50 for a barrier element such as 26 to be described in greater detail hereinbelow. Desirably such a housing may be formed by a drawing or spinning operation. The medial part of the plate 25 is connected to a crankshaft to rotate therewith. This separator is positioned to be effective to remove entrained lubricant and the like from the fluid flowing from a sealed crankcase to a transfer passage as 27 which leads to an intake port in the cylinder as described hereinabove. Slots as 51 may be formed at spaced intervals in the ring or flange 25 to permit the flow therethrough of a fluid such as an admixture of air and fuel. The centrifugal force attendant to rotation of the housing causes lubricant or the like trapped by the ring 26 to be thrown therefrom so that the lubricant may return to the supply thereof maintained at the bottom of the crankcase. Interiorly of the slots 51 the flange 25 may comprise a plurality of plates 52 inclined inwardly in the direction of rotation to facilitate the removal of oil from within the separator. A foraminous barrier ring, not shown, is mounted interiorly of the plates 52.

Another embodiment of a separator constructed in accordance with this invention is shown in FIG. 4, and here again a disc or plate 23 is provided which is fast to the adjacent end of the crankshaft. The plate and flange constitute a housing indicated generally by the reference numeral 50A. A flange or ring 25 is provided at the periphery of the plate 23 to extend in right angular relation therewith. A plurality of circular openings 53 are provided in relatively close relation in the flange or ring 25. Inwardly of the flange or ring 25 a corrugated screen as 54 is provided which is in the form of a ring and which is engaged with the inner face of the flange 25. The screen 54 preferably embodies a plurality of layers or laminations related one to the other as shown, by way of example, in FIG. 5.

In FIG. 5 there is illustrated an enlarged portion of the barrier ring 54. The ring comprises a number of layers of relatively fine metal mesh which are disposed in random alignment with respect to one another. Three such layers 54A, 54B, and 54C are illustrated. The layers may be concentrically wound on an annular mandrel under tension, anchored, and the barrier then mounted within the housing 50.

Advantageously, a sealing arrangement as 56 is associated with the flange or ring 25 and the outer periphery 57 of the conduit 27 to prevent leakage past the filter. If desired, a similar sealing arrangement could be associated with the filter shown in FIG. 3.

In FIGS. 6 and 7 there is illustrated a further embodiment of a separator constructed in accordance with this invention. In this embodiment a circular plate 23 includes an outwardly directed flange 25 at its periphery to provide a housing, indicated generally by the reference numeral 50B, for a barrier ring 62 mounted therein. The flange 25 is provided with a plurality of circular shaped openings 61 extending radially through the flange. The barrier ring 62 may be formed from fibrous or felt material or may be formed from a sintered metal or other porous, foraminous material. Means for rotating the housing and the barrier ring, such as the crank shaft 16 of the internal combustion engine 10, are connected to the plate 23.

In the operation of the various embodiments of the liquid and gas separator according to this invention, the separator unit is inserted in a flow path of a gaseous fluid which may contain entrained liquids in a manner such that the separator unit intercepts all such fluid flow. Preferably the separator unit is interposed in the flow path in a manner such that the gaseous fluid flows from the exterior surface of the housing and radially through the perforations in the flange of the housing and through the barrier ring into the interior of the housing. Any entrained liquid is intercepted and contained by the foraminous barrier ring. The rotation of the separator develops a centrifugal force in the liquid intercepted and contained within the foraminous barrier ring, and this centrifugal force causes the liquid to move radially outwardly of the foraminous barrier and the perforations in the flange of the housing.

Thus in accordance with this invention, there is provided a compact liquid and gas separator which, when interposed in a flow path of a gaseous liquid containing fluid, may be rotated to remove the entrained liquid from the gaseous fluid in a highly effective manner.

While the present invention has been described with particular reference to an internal combustion engine, it will be appreciated that the principle of radial flow incidental to separation of entrained liquids or mists is applicable in other circumstances. Thus, there are many circumstances where it is advantageous to be able to effectively remove entrained liquids, droplets, or mists from an otherwise gaseous body, and hence the principle of the present invention can be utilized in such other circumstances, particularly where there is a rotary member capable of carrying the separator of the present invention and which is interposed in the path of the flow in the gaseous body containing condensed fluids, mists, or the like that are to be effectively removed therefrom.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:
1. A liquid and gas separator unit insertable in a flow path of a gaseous fluid for intercepting all such gaseous fluid flow and comprising, a carrier member including a circular imperforate plate and an annular flange projecting from the periphery of one face of the plate, said flange having perforations extending radially therethrough, means for directing the flow of gaseous fluid radially inwardly of said flange perforations, an annular foraminous barrier constructed of multiple concentric rings of metal mesh mounted within the carrier member flange for intercepting fluid flowing radially inwardly through the perforations in the flange, and means for rotating the carrier member to develop a centrifugal force in any entrained liquid flowing through the foraminous barrier to cause such liquid to move radially outwardly of the barrier member against the normal direction of fluid flow.

2. A liquid and gas separator unit insertable in a flow path of a gaseous fluid for intercepting all such gaseous fluid flow and comprising, a rotatable carrier member including a circular imperforate plate and an annular flange projecting perpendicularly from the periphery of one face of the plate, said flange having perforations extending radially therethrough, means for directing the flow of gaseous fluid radially inwardly through said flange perforations, blade means comprising a plurality of circumferentially spaced blade elements defining flow channels therebetween and disposed radially inwardly of said flange, said blades being inclined inwardly in the direction of rotation of said carrier member, an annular foraminous barrier constructed of a fibrous material mounted within the carrier member flange radially inwardly from said blade means for intercepting fluid flowing radially inwardly through the perforations in the flange, and means for rotating the carrier member to develop a centrifugal force in any entrained liquid flowing through the foraminous barrier to cause such liquid to move radially outwardly of the barrier member against the normal direction of fluid flow.

3. A separator for removing entrained liquids from a flow of a gaseous fluid comprising, conduit means including an inlet opening for directing a flow of the gaseous fluid to a point of utilization, an imperforate circular plate having a diameter larger than the conduit inlet opening and mounted in adjacent, spaced relation with the conduit inlet opening, a perforated annular flange projecting outwardly from a surface of the circular plate facing the conduit inlet opening, seal means extending between the outermost projecting portion of the annular flange and a portion of the conduit means surrounding the periphery of the inlet opening whereby all fluid flow from the perforated flange to the conduit passes radially inwardly through the the perforations in the annular flange, an annular foraminous barrier member mounted within the annular flange and extending across the perforations in the annular flange to intercept fluid flow therethrough, and means for rotating the circular plate to impart a centrifugal force to any entrained liquid contained within a fluid passing through the barrier member.

References Cited in the file of this patent
UNITED STATES PATENTS
302,163    Saladin _____ July 15, 1884
(Other references on following page)

UNITED STATES PATENTS

| | | |
|---|---|---|
| 1,051,017 | Schmidt | Jan. 21, 1913 |
| 1,262,146 | Ward | Apr. 9, 1918 |
| 1,348,966 | Smith | Aug. 10, 1920 |
| 1,871,022 | Zellweger | Aug. 9, 1932 |
| 1,962,425 | Carlson | June 12, 1934 |
| 2,204,814 | Newell | June 18, 1940 |
| 2,247,786 | Riddle | July 1, 1941 |
| 2,539,896 | Dalrymple | Jan. 30, 1951 |
| 2,889,007 | Lunde | June 2, 1959 |
| 2,959,164 | Janeway et al. | Nov. 8, 1960 |

FOREIGN PATENTS

| | | |
|---|---|---|
| 410,864 | Germany | Mar. 23, 1925 |
| 126,226 | Austria | Jan. 11, 1932 |
| 532,467 | Great Britain | Jan. 24, 1941 |
| 130,295 | Sweden | Dec. 12, 1950 |
| 1,137,245 | France | Jan. 7, 1957 |